US010099412B2

(12) United States Patent
Zajtai et al.

(10) Patent No.: US 10,099,412 B2
(45) Date of Patent: *Oct. 16, 2018

(54) METHOD OF MAKING A DISPENSER OR A PART THEREOF AND A DISPENSER OR PART MADE BY SAID METHOD

(71) Applicant: SCA HYGIENE PRODUCTS AB, Göteborg (SE)

(72) Inventors: Csaba Zajtai, Zalaegerszeg (HU); Imre Poczik, Györladamér (HU)

(73) Assignee: ESSITY HYGIENE AND HEALTH AKTIEBOLAG, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,633

(22) Filed: Apr. 26, 2016

(65) Prior Publication Data

US 2016/0236386 A1  Aug. 18, 2016

Related U.S. Application Data

(62) Division of application No. 12/992,908, filed as application No. PCT/EP2009/055831 on May 14, 2009, now Pat. No. 9,370,888.

(30) Foreign Application Priority Data

May 16, 2008 (SE) .................................... 0801131-4

(51) Int. Cl.
*B29C 45/16* (2006.01)
*B65D 83/00* (2006.01)
(Continued)

(52) U.S. Cl.
CPC .......... *B29C 45/1657* (2013.01); *B65D 83/00* (2013.01); *A47F 1/04* (2013.01);
(Continued)

(58) Field of Classification Search
CPC ....... B29C 45/1657; B65D 83/00; A47F 1/04; A47F 5/12; A47K 10/32
See application file for complete search history.

(56) References Cited

U.S. PATENT DOCUMENTS 53,219 A    3/1866   Fawcett
3,406,873 A  10/1968  Zackheim
(Continued)

FOREIGN PATENT DOCUMENTS

CN    1225063 A    8/1999
CN    1708889 A    12/2005
(Continued)

OTHER PUBLICATIONS

Office Action from the European Patent Office (EPO) for Application No. 09 745 788.1 dated Jun. 2013.
(Continued)

*Primary Examiner* — Edmund H Lee
*Assistant Examiner* — Jamel M Nelson
(74) *Attorney, Agent, or Firm* — Drinker Biddle & Reath LLP

(57) ABSTRACT

A method for manufacturing a dispenser part, such as a dispenser or a part of a dispenser, having at least two component parts joined by a seam extending from a first side edge to a second side edge of the dispenser part. The method involves using a single mold and producing the dispenser part using a two component injection molding process. A dispenser or a dispenser part including at least two component parts joined by a seam achieved by the method, and a component part used in such a dispenser or dispenser part are also described.

2 Claims, 9 Drawing Sheets

(51) Int. Cl.
  *B29K 55/02* (2006.01)
  *A47F 1/04* (2006.01)
  *A47K 5/12* (2006.01)
  *A47K 10/32* (2006.01)
  *B29L 31/00* (2006.01)

(52) U.S. Cl.
  CPC ............. *A47K 5/12* (2013.01); *A47K 10/32* (2013.01); *A47K 2010/3206* (2013.01); *A47K 2010/3233* (2013.01); *B29K 2055/02* (2013.01); *B29L 2031/712* (2013.01)

(56) References Cited

U.S. PATENT DOCUMENTS

| | | | |
|---|---|---|---|
| 4,080,842 | A | 3/1978 | Lapeyre et al. |
| 4,261,947 | A | 4/1981 | Ogi |
| 4,622,731 | A | 11/1986 | Kjell |
| 4,989,519 | A | 2/1991 | Welsch et al. |
| 5,094,602 | A | 3/1992 | Morita |
| 5,407,292 | A | 4/1995 | Collins |
| 5,439,143 | A | 8/1995 | Brown et al. |
| 5,439,309 | A | 8/1995 | Raz |
| 5,458,361 | A | 10/1995 | Gajewski |
| 5,465,856 | A * | 11/1995 | Sheffler ............... B29C 65/08 215/370 |
| 5,472,655 | A | 12/1995 | Morita |
| 5,562,226 | A | 10/1996 | Valyi et al. |
| 5,618,485 | A | 4/1997 | Gajewski |
| 5,927,566 | A | 7/1999 | Mueller |
| 6,168,588 | B1 | 1/2001 | Wilson |
| 7,037,393 | B2 | 5/2006 | Drummond et al. |
| 7,240,390 | B2 | 7/2007 | Pfenniger et al. |
| 7,247,036 | B2 | 7/2007 | Quintman et al. |
| 7,506,754 | B2 | 3/2009 | Segovia, Jr. et al. |
| 7,661,953 | B2 | 2/2010 | Sekito et al. |
| 7,731,669 | B2 | 6/2010 | Mathews et al. |
| 7,757,884 | B2 | 7/2010 | Scheifele |
| 7,837,077 | B2 | 11/2010 | Formon et al. |
| 8,609,216 | B2 | 12/2013 | Zajtai et al. |
| 8,733,571 | B2 | 5/2014 | Zajtai et al. |
| 2003/0122031 | A1 | 7/2003 | Tramontina et al. |
| 2004/0060138 | A1 | 4/2004 | Pfenniger et al. |
| 2004/0129825 | A1 | 7/2004 | Andersson |
| 2005/0067084 | A1 | 3/2005 | Kagan et al. |
| 2005/0249900 | A1 | 11/2005 | Barre et al. |
| 2006/0025718 | A1 | 2/2006 | Ostrowski |
| 2006/0204731 | A1 | 9/2006 | Wani et al. |
| 2006/0219727 | A1 | 10/2006 | Giraud |
| 2007/0062967 | A1 | 3/2007 | Zaidman et al. |
| 2007/0114246 | A1 | 5/2007 | Awbrey et al. |
| 2007/0234868 | A1 | 10/2007 | Formon et al. |
| 2008/0062697 | A1 | 3/2008 | Swantner et al. |
| 2009/0081407 | A1 | 3/2009 | Giraud |
| 2010/0224646 | A1 | 9/2010 | Incorvia et al. |
| 2011/0101030 | A1 | 5/2011 | Csaba et al. |
| 2013/0011586 | A1 | 1/2013 | Landry et al. |

FOREIGN PATENT DOCUMENTS

| | | |
|---|---|---|
| CN | 1836886 A | 9/2006 |
| CN | 101080188 A | 11/2007 |
| DE | 41 07 276 A1 | 9/1992 |
| EP | 2060218 A1 | 5/2009 |
| JP | S58-071119 A | 4/1983 |
| JP | S59-133029 A | 7/1984 |
| JP | H03-120022 A | 5/1991 |
| JP | H06-218766 A | 8/1994 |
| JP | 2002-029538 A | 1/2002 |
| RU | 2225156 C1 | 3/2004 |
| RU | 2293508 C2 | 2/2007 |
| RU | 2382589 C2 | 2/2010 |
| SU | 1 624 986 A3 | 1/1994 |
| WO | WO-98/02361 A1 | 1/1998 |
| WO | WO-1999018835 A1 | 4/1999 |
| WO | WO-2006054965 A2 | 5/2006 |
| WO | WO-2007-035139 A1 | 3/2007 |

OTHER PUBLICATIONS

Office Action from the Mexican Institute of the Industrial Property for PCT Patent Application No. MX/a/2010/012466 dated May 8, 2013.
Office Action from the State Intellectual Property Office (SIPO) of the People's Republic of China for Application No. 200980117435.1 dated Apr. 2013.
Office Action from the Mexican Institute of the Industrial Property for PCT Patent Application No. MX/a/2010/012468 dated May 9, 2013.
Office Action from the State Intellectual Property Office (SIPO) of the People's Republic of China for Application No. 20090117441.7 dated May 15, 2013.
Office Action from the Mexican Institute of the Industrial Property for PCT Patent Application No. MX/a/2010/012467 dated May 14, 2009.
Decision to Grant issued in Russian patent application 2010151595, filing date May 14, 2009.
Decision to Grant issued in Russian patent application 2010151624, filing date May 14, 2009.
Notification of the 2nd Office Action from the State Intellectual Property Office (SIPO) of the People's Republic of China for Application No. 200980117434.7, dated Jul. 16, 2013.
Decision to Grant in Russian patent application 2010151594, filing date May 14, 2009.
"Processing Plastic Materials," by Shwarz et al., publication dated 2005, St. Petersburg, publication house "Profession".
Notification of the 2nd Office Action from the State Intellectual Property Office (SIPO) of the People's Republic of China for Application No. 200980117442.1, dated Jul. 24, 2013.
International Search Report, dated Oct. 8, 2009, from corresponding PCT application No. PCT/EP2009/055631.
Swedish Search Report, dated Nov. 21, 2008, from corresponding Swedish application No. ITS/SE08/00187.
Johannaber-Michaeli, Ed., "Handbuch Spritzgiessen, 6- Sonderverfahren der Spritzgiesstechnologie", Handbuch Spritzguessen, Jan. 1, 2004, pp. 514-523, XP-002454810.
Oberbach, Karl et al., excerpt from Saechtling Kunststoff Taschenbuch, 26. Ausgabe (1995), pp. 384-393.

* cited by examiner

METHOD OF MAKING A DISPENSER OR A PART THEREOF AND A DISPENSER OR PART MADE BY SAID METHOD

CROSS-REFERENCE TO RELATED APPLICATIONS

This application is a division of U.S. patent application Ser. No. 12/992,908, filed Jan. 14, 2011, the entire contents of which is incorporated herein by reference. U.S. patent application Ser. No. 12/992,908 is a 371 national stage application of international application No. PCT/EP2009/055831, filed May 14, 2009, which claims the benefit under 35 U.S.C. § 119 of Swedish Patent Application No. 0801131-4, filed May 16, 2008, the contents of both of which are incorporated herein by reference.

TECHNICAL FIELD

The present invention concerns dispenser parts, in particular dispensers or parts of dispensers, comprising at least two components selected from a range of plastic materials, which components may be joined along a seam extending from a first side edge to a second side edge of the dispenser part. The invention also relates to a method for making such dispenser parts.

BACKGROUND ART

In many types of dispensers it is for various reasons often desirable to provide a dispenser part where at least an outer surface, a shell or a similar dispenser part is made from two similar or different plastic materials. For instance, it is possible to make one section of the dispenser part transparent, in order to facilitate checking of the level of a consumable product contained within the dispenser. A second section can be made opaque in order to hide a dispensing mechanism, to allow monitoring of the filling level and to provide a dispenser with an aesthetically pleasant appearance.

When making such a dispenser part, the first component is usually injection moulded in a first mould and transferred to a second mould to be joined by a subsequently injected component. A dispenser part manufactured in this way may have problems with distortion of at least the first component, as well as of the seam, in particular in or near the regions of the side edges. The component parts are usually joined end-to-end and even with local reinforcements, the seam may lack sufficient strength to withstand the forces it may be expected to withstand. For example, the front of the dispenser may be exposed to accidental or intentional point loading, such as an impact force caused by an object or a person striking the dispenser. A weak seam may cause the dispenser part making up the cover to crack along at least part of the front surface, requiring the dispenser part to be replaced.

The object of the invention is to provide an improved dispenser part and method for making it, in order to solve the above problems relating to the distortion of the dispenser part and the strength of the seam.

DISCLOSURE OF INVENTION

The above problems have been solved by a method for manufacturing a dispenser part, such as a entire dispenser or a part of a dispenser, a dispenser part and a component part made by this method according to the appended claims.

The invention relates to the manufacture of dispenser parts, in particular dispensers or parts for dispensers for consumable materials in restaurants, restrooms or similar. Dispensers of this type may be intended for rolls or stacks of paper or other wiping materials, or for washing substances such as liquid hand cream, soap or other detergents.

In the subsequent text, terms such as front, rear, inner and outer are defined in relation to a visible outer front or side surface of the dispenser itself or, where appropriate, a surface of a dispenser part located in a dispenser which surface faces the user. In addition, the term "seam" is used as a general term defining any seam or joint suitable for joining two component parts comprising plastic material into a single dispenser part. In general, the term "dispenser part" is used to denote both an entire dispenser as well as a structural part of a dispenser. In the latter case, a structural part may comprise a visible outer cover, or a portion thereof, or a structural portion of the dispenser located inside an outer cover. Also, the term "component part" is used to denote each injection moulded component that is joined with one or more additional component parts to form a dispenser part.

According to a preferred embodiment, the invention relates to a method of manufacturing a dispenser part comprising at least two component parts each joined by a seam extending from a first side edge to a second side edge of the dispenser part. When referring to a "dispenser part" in the subsequent text, this term refers to a single part dispenser or to an internal part, an outer shell or an outer cover of a dispenser for paper wipes/towels, coreless rolls, plastic or paper cups, liquid soap/cream, or similar dispensers. The front part, shell or cover may comprise two component parts made from the same or different plastic materials in any desired combination of opaque, semi-opaque, semi-transparent or transparent form. The component parts making up the dispenser part may also have functionally different properties, wherein the component parts may comprise a cover section joined to a cutting device using the method provided. However, the invention is not limited to visible component parts, as a seam according to the invention may also be suitable for dispenser parts mounted internally in such dispensers. The method involves using a single mould and producing the dispenser part using a two component injection moulding process.

The two component injection moulding process involves performing a first injection moulding step to produce at least a first part in said mould, retaining the at least one part in the mould, and performing a second injection moulding step to produce at least second part in said mould and to complete the dispenser part. The mould is located in a first position during the first injection step, and is then moved or rotated to a second position in which the second injection step and the subsequent cooling is performed. In its simplest form, the method is used to make a dispenser part with a single first and second part. Such a dispenser part may comprise an upper first part of a first material, being transparent, and a lower second part of a second material, being opaque. However, a number of variations are possible within the scope of the invention. For instance, a dispenser part in the form of a front cover may comprise a transparent first part, extending horizontally across a central portion of the dispenser part, and upper and lower opaque second parts, or vice versa. According to the invention, when the dispenser part comprises more than one first and one second part, all first parts are moulded in the first injection moulding step and all second parts are moulded in the second injection moulding step. Hence the dispenser part may comprise at least one seam, where each component part is joined to an adjacent component part by a seam according to the invention during the said injection moulding process.

A first edge of the at least one first part and an injected second edge of the at least one second part are joined to form said seam during the second injection moulding step. Each first edge of the at least one first part is moulded to form at least one step in a transverse direction to the first edge. The at least one step is preferably, but not necessarily, moulded along each first edge from the first to the second side edge of the first component part.

For each first part the at least one step may be moulded to form a first contact surface at right angles to an inner or an outer surface of the dispenser part, and a second contact surface extending towards the first edge. Hence, the second contact surface is arranged to extend between the inner and outer surfaces both in the transverse and the longitudinal direction of the seam. The second contact surface may be moulded to form raised contact increasing means along the length of the seam, preferably along the entire length of the seam. The raised contact increasing means will melt upon contact with the material injected during the second injection moulding step.

In this context, the longitudinal direction of the seam is defined as the direction of the front edge of the respective component part where they are joined by the seam, or the general direction of the front edge should the edge be non-linear. The transverse direction of the seam in a particular location is defined as the direction at right angles to the said front edge in the plane of the dispenser part at the said location.

Each first edge of the first component part may be injection moulded to form at least two steps. This may be achieved by moulding the first edge to form a third contact surface at right angles to an outer or an inner surface of the dispenser part. For instance, in its simplest form, the seam may comprise a first contact surface at right angles to an outer surface of the dispenser part, and a second contact surface extending towards the first edge. The seam is completed by a third contact surface at right angles to an inner surface of the dispenser part.

According to one example, the method involves moulding the raised contact increasing means to form at least one additional step in the second contact surface, between the first and third contact surfaces. The height of the steps may be selected depending on the thickness of the dispenser wall adjacent the seam and may for instance be selected in a range from 0.05 to 3 mm. The steps are preferably, but not necessarily, given an equal height. For instance, in a seam connecting a transparent and an opaque part, the first step adjacent the outer surface of the dispenser part is preferably, but not necessarily, larger than the additional steps. This gives a distinct line separating the two parts and facilitates filling of the mould adjacent the edge of the first part during the second injection moulding step. An opaque material having a thicker first step adjacent the seam will also prevent this portion of the dispenser part from becoming partially transparent. For instance, a dispenser wall may have a constant total thickness of 1-6 mm, preferably 2.5-4.5 mm, adjacent the seam. A first step provided adjacent the outer surface and a first step provided adjacent the inner surface may each have a height of 0.2-1 mm. These first and second steps may be separated by a number of intermediate additional steps with a height of 0.05-1 mm. The intermediate steps are preferably, but not necessarily of equal height. The separation between ach adjacent step may be a distance equal to or greater than the height of the smaller of said steps. Each corner of the said additional steps will melt during the second injection moulding step.

The steps may extend continuously or intermittently along the entire longitudinal length of the seam. If the steps are arranged intermittently, then the sum of all intermittent sections provided with steps should have a total length not less than half the length of the seam. The spacing between adjacent stepped sections may be constant or variable. Preferably, the stepped sections should coincide with non-planar sections of the seam, such as corners, of sections that may be subject to impact loading.

According to an alternative example, the method involves moulding the said raised contact increasing means to form at least one suitable projection. Similar to the above example, each first edge of the first component part may be injection moulded to form at least two steps. The seam may comprise a first contact surface at right angles to an outer surface of the dispenser part, and a second contact surface extending towards the first edge. The seam is completed by a third contact surface at right angles to an inner surface of the dispenser part. In this example, the height of the first and third contact surfaces may be equal to or approximately equal to half the thickness of the dispenser wall adjacent the seam. The raised contact increasing means may form at least one projection along the length of the seam, such as one or more flat projections extending at right angles out of the second contact surface along the length of the seam.

Alternatively, the raised contact increasing means may form multiple, individual projections in at least one regular or irregular line along the length of the seam. The projections may also be evenly or intermittently distributed over the entire second contact surface, wherein a greater concentration of projections are provided along portions of the seam subjected to relatively large forces during an impact. These projections may be shaped as circular, rectangular or triangular columns, or as hemispherical, conical, pyramidal or V-shaped projections. The projections may have a height up to approximately half the height of the first step, or the first contact surface. The largest cross-sectional dimension of a projection, measured at the base of such a projection in the plane of the second contact surface, may be up to twice its height.

The projections may extend continuously or intermittently along the entire longitudinal length of the seam. If the projections are arranged intermittently, then the sum of all intermittent sections provided with projections should have a total length not less than half the length of the seam. The spacing between adjacent sections provided with projections may be constant or variable. Preferably, the sections provided with projections should coincide with non-planar sections of the seam, such as corners, of sections that may be subject to impact loading.

According to a further example, the method involves moulding the raised contact increasing means to form extended ridges. Similar to the above alternative example, each first edge of the first component part may be injection moulded to form at least two steps of equal height. In this example, the height of the first and third contact surfaces may be equal to or approximately equal to half the thickness of the dispenser wall adjacent the seam. The raised contact increasing means may form at least one ridge along the length of the seam. Such a ridge may have a V-shaped cross-section in the transverse direction of the seam. Alternatively, multiple, parallel ridges having a V-shaped cross-section may be provided.

The ridges may extend continuously or intermittently along the entire longitudinal length of the seam. If the ridges are arranged intermittently, then the sum of all intermittent sections provided with ridges should have a total length not less than half the length of the seam. The spacing between adjacent sections provided with ridges may be constant or variable. Preferably, the sections provided with ridges should coincide with non-planar sections of the seam, such as corners, of sections that may be subject to impact loading.

In the above examples, the at least one projection or ridge may have a height up to half the thickness of the first contact surface, measured from the base of the projection to the outer surface of the finished dispenser part in a direction at right angles to the said outer surface. The projections may be given the same or different heights.

The seam described in all the above examples may have a transverse width extending over a distance of up to 5 times the thickness of the thinner of the first and second parts, in a direction transverse to the direction of the seam between the component parts in the plane of the said component parts.

If the first part comprises a transparent material, the steps are formed to reduce the thickness of each first edge towards the inner surface of the first part. The second part may comprise an opaque material and the opposing edge of the second part can be used to hide the raised contact increasing means of the seam between the component parts. According to one example, the first and second parts may have the same thickness at either side of and across the seam. According to a further example, the wall thickness of the first part may be gradually increased in the direction of the edge of the first part adjacent the seam.

In order to achieve a desired strength each corner of the said steps, or each projection, is arranged to melt during the second injection moulding step. It has been found that by providing steps formed by substantially right angled corners along the entire length of the seam, the formation of a homogenous, strong seam is achieved. When the molten material injected during the second injection moulding step reaches the solidified edge of the first part, the corners or projections facilitate the melting together of the first and second parts. In order to ensure this, the temperature of the material to be injected and/or the temperature or one or both mould may be controlled to achieve the desired result. For instance, the temperature of the material injected at least during the second injection moulding step may be selected above the recommended injection temperature for the particular material. As the second material flows through the mould towards the first part, its temperature will gradually drop. However, as the initial temperature at the start of the injection is higher than normal, the temperature of the molten second material will still be sufficient to melt the edge of the solidified first part. The temperature of the first part may be controlled by adjusting the cooling of the mould. The first part is retained in the mould after the first injection moulding step, in order to maintain the shape of the first part as it begins to cool and to maintain the first part at an elevated temperature until the second injection moulding step has been completed. The finished dispenser part may then be cooled and removed from the mould.

In combination with a choice of compatible resin materials and suitable injection temperatures for the first and second materials, a seam as described above will have an improved impact strength as compared to prior art seams manufactured by conventional methods. The impact strength can be defined as the energy required to fracture a specimen subjected to shock loading, as in an impact test. Alternative terms are impact energy, impact value, impact resistance and energy absorption.

The invention further relates to a dispenser part manufactured by the method as described above. The dispenser part comprises at least two parts joined by a seam extending from a first side edge to a second side edge of the dispenser part. The seam joining the respective first and second parts has an impact strength at least equal to that of either of the first and second parts adjacent the seam. In practice, this means that when subjected to an impact in the general area of the seam, the dispenser part will first fracture to one side of or parallel with the seam but not in or along the seam itself.

The invention also relates to a component part of a dispenser part manufactured by the said method. The component part is an intermediate product arranged to be made during a first injection moulding step, wherein a first edge of the at least one first part comprises a number of distinct steps. These steps have been described in the above text.

The dispenser part may comprise two or more injection moulded components joined by a seam having a predetermined strength. This may be achieved by a dispenser part comprising a first injection moulded plastic component part having an associated first mating surface; a second injection moulded plastic component part having an associated second mating surface; and a seam formed by said first mating surface and said second mating surface during injection moulding for joining said first component part and said second component part to define a dispenser part. The strength of the resulting seam is preferably equal to or greater than the strength of at least one of said first and second moulded plastic component parts. The impact strength of the resulting seam is preferably equal to or greater than the strength of at least one of said first and second moulded plastic component parts.

The first mating surface and said second mating surface are generally non-planar, in that the seam extends from a first side edge at a first side wall of the dispenser part, across at least part of the front surface, and to a second side edge at a second side wall of the dispenser part.

In order to achieve the desired strength, the dispenser part should be injection moulded using materials having suitable properties for this purpose. According to one example, each of said first component and said second component part is selected from the group acrylonitrile butadiene styrene (ABS) plastic material. According to a second example, the first component part is an ABS plastic material and said second component part is an methyl methacrylate-ABS (MABS) plastic material. Depending on the desired properties or use of the dispenser part, the first component part may be an opaque ABS plastic material, and the second component part may be a transparent MABS plastic material. The transverse cross sectional thickness of the dispenser part at said seam may be between 1, and 6 mm, preferably between 2.5 and 4.5 mm.

A stated above, the first and second plastic component parts may be moulded from the group selected from ABS plastic material. Alternatively a polycarbonate plastic material may be used, although such materials have less scratch resistance. Similar to the ABS/MABS plastic materials, said polycarbonate plastic material may be either transparent or opaque.

The strength of the dispenser part across the seam should be such that, in bending, the seam has a peak load of at least 35 MPa, preferably over 40 MPa, most preferably over 50 MPa. A comparison between a number of seams according to the invention and a conventional seam will be described in detail below. According to one example, a transverse cross section of the seam may comprise at least one step or projection along the entire length of the seam, as described above.

The dispenser part may also comprise two or more injection moulded components joined by a continuous seam extending from one side of the dispenser part to another. This may be achieved by a dispenser part comprising a first injection moulded plastic component part with an associated first mating surface; a second injection moulded plastic component part having an associated second mating surface; a seam formed by said first mating surface and said second mating surface during injection moulding for joining said first component part and said second component part to define a dispenser part, and component part comprising a front surface, a first and a second side surface each having an edge facing away from the front surface. The resulting seam is arranged to extend from the edge associated with the first side surface to the edge associated with the second side surface of the dispenser part. In this case, the first mating surface and the second mating surface are generally non-planar.

In order to achieve a non-planar seam connecting two components from a first free edge to a second free edge, the dispenser part should be injection moulded using materials having suitable properties for this purpose. In addition to seam strength, it is desirable to use materials that do not shatter when subjected to an impact at or near the seam.

According to one example, each of said first component and said second component part is selected from the group acrylonitrile butadiene styrene (ABS) plastic material. According to a second example, the first component part is an ABS plastic material and said second component part is an methyl methacrylate-ABS (MABS) plastic material. Depending on the desired properties or use of the dispenser part, the first component part may be an opaque ABS plastic material, and the second component part may be a transparent MABS plastic material. The transverse cross section thickness of the dispenser part at said seam may be between 1, and 6 mm, preferably between 2.5 and 4.5 mm.

The seam should be able to withstand an impact of at least 10 joule, but preferable 15 Joule without cracking at its free edges or along non-planar areas. A suitable method for testing seams according to the invention, as well as conventional seams will be described in detail below. According to one example, a transverse cross section of the seam may comprise at least one step along the entire length of the seam.

The dispenser part may further comprise two or more injection moulded components joined by a seam shaped to provide a predetermined strength and impact resistance. This may be achieved by a dispenser part comprising at least one first injection moulded plastic component part with an associated first mating surface; at least one second injection moulded plastic component part having an associated second mating surface; a seam formed by said first mating surface and said second mating surface during injection moulding for joining said first component part and said second component part to define a dispenser part. A transverse cross section of the seam comprises a contact surface intermediate an inner and an outer surface of the dispenser part.

According to one example, the invention relates to a dispenser part comprising at least two parts joined by a seam extending from a first side edge, across a front surface and to a second side edge of the dispenser part. The dispenser part may comprise more than one first and second component part, each injected during a first and second injection moulding step, respectively. Hence, each first component part may comprise one or two contact surfaces depending on the shape and/or design of the dispenser part.

Each contact surface is arranged to extend along the length of the seam and at least one contact surface may have a transverse extension of up to 5 times the thickness of at least one of the first or second component parts adjacent the seam. Alternatively, the contact surface may have a transverse extension between 3 and 5 times the thickness of at least one of the first or second component parts adjacent the seam. The extent of the transverse extension of the contact surface may be defined as the total length of the overlap between the first and second component parts at right angles to the seam parallel to the outer surface of the dispenser part. This at least one component is preferably the thinner of the first and second component parts. Alternatively, it may also be the component having a constant thickness leading up to the seam, in the transverse direction thereof. The seam may have a maximum thickness that is equal to or greater than that of at least one of the first or second component parts adjacent the seam. The maximum thickness may be 1.2 to 1.5 times the thickness of the said component parts.

Preferably, but not necessarily, the transverse cross section of the seam comprises a first step adjacent and at substantially right angles to the outer surface of the dispenser part. The at least one step extends along each first edge from the first to the second side edge. Each at least one step may form a first contact surface at right angles to an inner or an outer surface of the dispenser part, and a second contact surface extending towards the first edge. The at least one step is preferably moulded along each first edge from the first to the second side edge of the first component part.

Hence, the second contact surface is arranged to extend between the inner and outer surfaces both in the transverse and the longitudinal direction of the seam. The second contact surface may be moulded to form raised contact increasing means along the length of the seam, preferably along the entire length of the seam. The raised contact increasing means will melt upon contact with the material injected during the second injection moulding step.

Each first edge of the first component part may be injection moulded to form at least two steps. This may be achieved by moulding the first edge to form a third contact surface at right angles to an outer or an inner surface of the dispenser part. For instance, in its simplest form, the seam may comprise a first contact surface at right angles to an outer surface of the dispenser part, and a second contact surface extending towards the first edge. The seam is completed by a third contact surface at right angles to an inner surface of the dispenser part.

According to one example, the method involves moulding the raised contact increasing means to form at least one additional step in the second contact surface, between the first and third contact surfaces. The height of the steps may be selected depending on the thickness of the dispenser wall adjacent the seam. This thickness is preferably measured at right angles to the front surface of the thinner of the component parts immediately before the seam. The height of the additional steps may for instance be selected in a range from 0.05 to 2 mm. The steps are preferably, but not necessarily, given an equal height. For instance, in a seam connecting a transparent and an opaque part, the first step adjacent the outer surface of the dispenser part is preferably, but not necessarily, larger than the additional steps. This gives a distinct line separating the two parts and facilitates filling of the mould adjacent the edge of the first part during the second injection moulding step. An opaque material having a thicker first step adjacent the seam will also prevent this portion of the dispenser part from becoming partially transparent. For instance, a dispenser wall or dispenser part may have a constant total thickness of 1-6 mm, preferably 2.5-4.5 mm, adjacent the seam. A first step provided adjacent the outer surface and a first step provided adjacent the inner surface may each have a height of 0.2-1 mm. These first and second steps may be separated by a number of intermediate additional steps with a height of 0.05-1 mm. The intermediate steps are preferably, but not necessarily of equal height. The separation between each adjacent step may be a distance equal to or greater than the height of the smaller of said steps. Each corner of the said additional steps will melt during the second injection moulding step.

According to an alternative example, the method involves moulding the said raised contact increasing means to form at least one suitable projection. Similar to the above example, each first edge of the first component part may be injection moulded to form at least two steps. The raised contact increasing means may form at least one projection along the length of the seam, such as one or more flat projections extending at right angles to the second contact surface along the length of the seam.

Alternatively, the raised contact increasing means may form multiple, individual projections in at least one regular or irregular line along the length of the seam. The projections may also be evenly distributed over the entire second contact surface. These projections may be shaped as circular, rectangular or triangular columns, or as hemispherical, conical, pyramidal or V-shaped projections.

According to a further example, the method involves moulding the raised contact increasing means to form extended ridges. Similar to the above example, each first edge of the first component part may be injection moulded to form at least two steps. The raised contact increasing means may form at least one ridge along the length of the seam. Such a ridge may have a V-shaped cross-section in the transverse direction of the seam. Alternatively, multiple, parallel ridges having a V-shaped cross-section may be provided.

In the above examples, the at least one projection or ridge may have a height up to half the thickness of the first contact surface, measured from the base of the projection to the outer surface of the finished dispenser part in a direction at right angles to the said outer surface. The projections may be given the same or different heights.

The seam described in all the above examples may have a transverse width extending over a distance of up to 5 times the thickness of the thinner of the first and second parts, in a direction transverse to the direction of the seam between the component parts in the plane of the said component parts.

If the first part comprises a transparent material, the steps are formed to reduce the thickness of each first edge towards the inner surface of the first part. The second part may comprise an opaque material and the opposing edge of the second part can be used to hide the raised contact increasing means of the seam between the component parts. According to one example, the first and second parts may have the same thickness at either side of and across the seam. According to a further example, the wall thickness of the first part may be gradually increased in the direction of the edge of the first part adjacent the seam.

According to a further example, the thickness of the first component part may be arranged to increase gradually in a transverse direction towards the seam. The maximum thickness of the seam may be up to 1.5 times the thickness of the second component part adjacent the seam. A forward end of the first component part is arranged to extend past the seam in the transverse direction of said seam. Subsequently, the forward end of the first component part may comprise a lip extending towards an inner surface of the second component part. In this way the total length of the contact surface as defined above, can be extended. This lip may be suitably rounded or angled towards the said inner surface.

A dispenser part as described above may comprise a first and a second component part, each having a front surface, and a first and a second side surface, each having an edge facing away from the common front surface. A seam according to the invention may be arranged to extend from the edge associated with the first side surface to the edge associated with the second side surface.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

EMBODIMENTS OF THE INVENTION

Figures 1A, 1B:
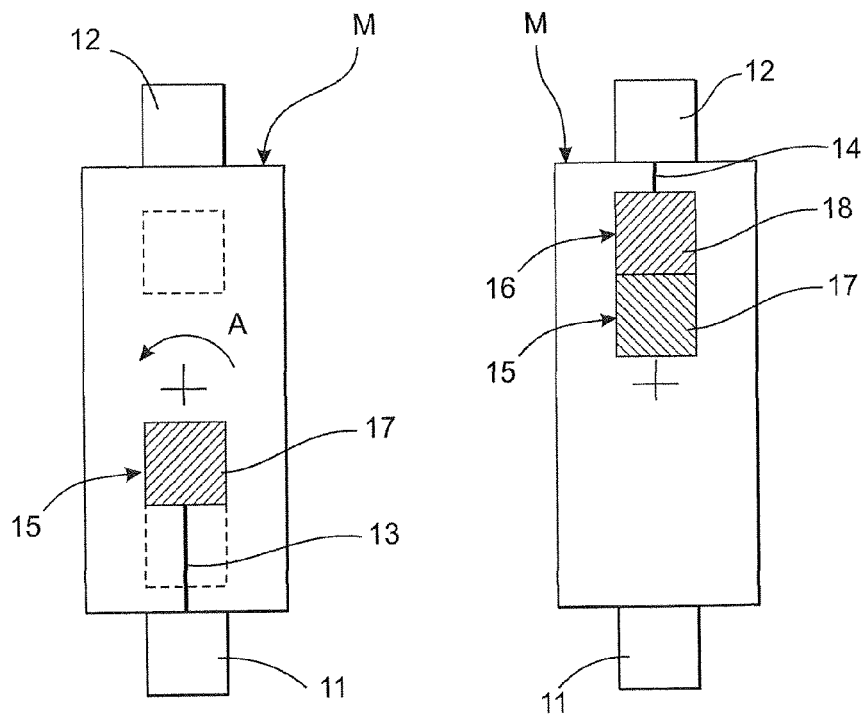
FIGS. 1A-B show a schematic illustration of an arrangement for carrying out a moulding process for making a dispenser part according to the invention.

FIGS. 1A and 1B show a schematic illustration of an arrangement for carrying out a two component injection moulding process for making a dispenser part according to the invention.

In this example, the process uses two injection units 11, 12 and a rotary mould M designed for sequential injection of a single part using two different materials. In the subsequent text the process is described for the injection of a transparent and an opaque material, but it is applicable for any combination of transparent and/or coloured materials. The mould M used in this example is a two cavity mould. The mould M is held closed in a first cavity position shown in FIG. 1A and heated to a predetermined operating temperature. The first material, which is usually the material having the highest injection temperature, is injected from the first injection unit 11 through a primary runner system 13 into a first cavity 15 to form a first component 17. In this example, the first material is a transparent or translucent resin. During the first injection, the mould volume to be occupied by the second material is shut off from the primary runner system. The mould is opened and a core plate is rotated 180°, as indicated by the arrow A, into a second cavity position shown in FIG. 1B, where after the mould closes. A secondary runner system 14 is connected to the volume to be filled and the second material is injected from the second injection unit 12 into a second cavity 16 to form a second component 18. In this example, the second material is an opaque resin. After sufficient cooling of the injected dispenser part 17, 18, the mould is opened and the dispenser part is ejected.

Figure 2:
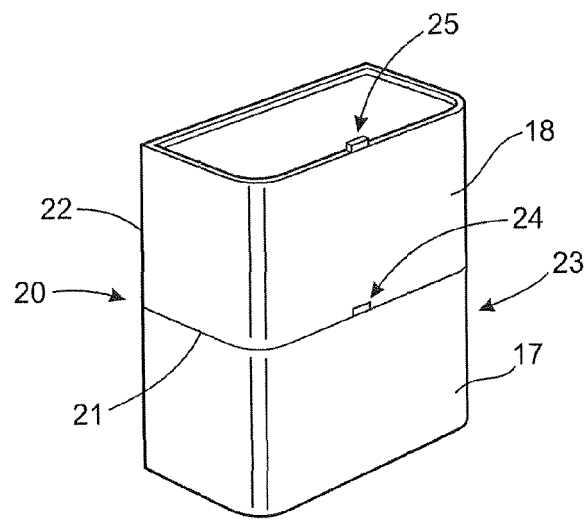
FIG. 2 shows a schematic illustration of a dispenser part made by the process according to the invention.

FIG. 2 shows a schematic illustration of a dispenser part 20 made by the above process. The dispenser part 20 is made up of the two component parts 17, 18 injected during the process shown in FIGS. 1A-B. The said component parts 17, 18 are joined along a seam 21, running from one side edge 22 to a second side edge 23 of the dispenser part 20. FIG. 2 further indicates the gating location 24 for the primary runner system 13 and the corresponding gating location 25 for the secondary runner system 14.

One factor to consider during the process is the relative melt temperature of the two materials. As stated above the material having the highest injection temperature is usually injected first. In order to ensure that the temperature of the second material is sufficient for at least partially melting a cooperating edge of the first material, the injection temperature of second material can be increased. The increased temperature can be higher than the injection temperature recommended by the manufacturer, but not higher than the degradation temperature of the material.

In the above example, the first material was a transparent resin that was tested at two different injection temperatures. The second material was an opaque resin injected at the same temperature in both tests. These tests are described in further detail below.

Further factors are the mould wall temperature, the injection speed, the delay time between injections, and the injected component part temperature. For instance, the mould wall temperature is controlled to maintain the first component part at a desired temperature during rotation of the first component into the second injection position. In this way, the edge of the first component will not cause the injected second material to cool before the cooperating edges have melted together. The temperature of both components can also be maintained during the consecutive injections in order to minimize distortion of the dispenser part during the subsequent cooling of the complete dispenser part. As each injection station is supplied by an independent injection unit, injection speeds and pressures can be accurately controlled and adapted for each material being injected.

In addition to the tool design, additional considerations are the wall thickness of the injected component, the surface structure of the part from the primary runner system to avoid venting problems, the tool surface and temperature for de-moulding, the gating location for optimum adhesion between component parts in dependence of flow path, and how the part will be de-moulded, causing a force to be applied to the adhesion area between component parts.

Figure 3:
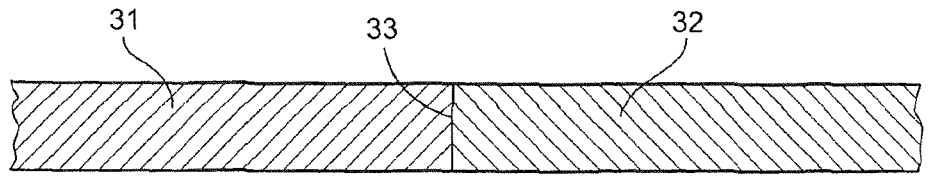
FIG. 3 shows a schematic illustration of a prior art seam.

In order to increase adhesion between the contacting edges of the two materials the seam has been given a particular configuration. A prior art seam, as shown in FIG. 3, made by joining the same two materials was used as a reference sample. The prior art sample was subjected to a comparative test using samples comprising a number of alternative seams according to the invention and a sample comprising a length of a homogenous opaque material having the same thickness as the reference sample. The seams according to the invention are shown in FIGS. 4A-4D. The test will be described in further detail below.

FIG. 3 shows a schematic illustration of a prior art seam between a transparent first component part 31 and an opaque second component part 32. The first and second component parts 31, 32 have the same wall thickness and are joined end-to-end by a straight, flat seam 33.

Figure 4A:
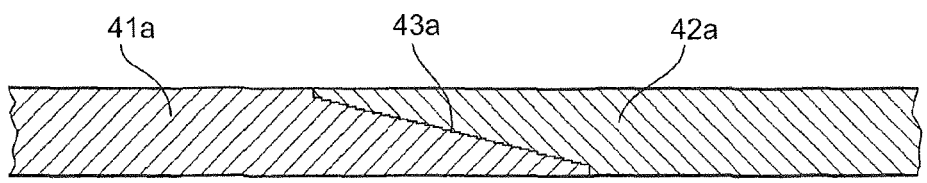
FIGS. 4A-D show a schematic illustration of cross-sections through a number of alternative seams according to the invention.

FIGS. 4A-D show a schematic illustration of cross-sections through a number of alternative seams according to invention. FIG. 4A shows a transparent first component part 41a and an opaque second component part 42a. The first and the second component parts 41a, 42a have the same wall thickness of 3 mm and are joined end-to-end by a seam 43a comprising a number of steps. The seam extends over a distance 2.5 times the thickness of the second component part 42a, in a direction transverse to the direction of the seam 43a between the component parts. The front surfaces of the respective joined component parts are completely flush with each other along the seam. In the region of the seam, the leading edge of the second component part 42a is arranged to overlap the first component part 41a in order to hide the seam 43a. The seam 43a will be described in further detail below (see FIG. 5). In FIGS. 4A-D the steps are shown as distinct steps with right angled corners for clarity. However, in the finished seam between two injection moulded components, at least the corners of the contacting surfaces have melted to form a fused seam. In order to achieve a desired strength each corner of the said steps is arranged to melt during the second injection moulding step. It has been found that by providing steps formed by substantially right angled corners along the entire length of the seam, the formation of a homogenous, strong seam is achieved. When the molten material injected during the second injection step reaches the solidified edge of the first part, the corners facilitate the melting together of the first and second parts. In order to ensure this, the temperature of the material to be injected and/or the temperature of the mould may be controlled to achieve the desired result.

Figure 4B:
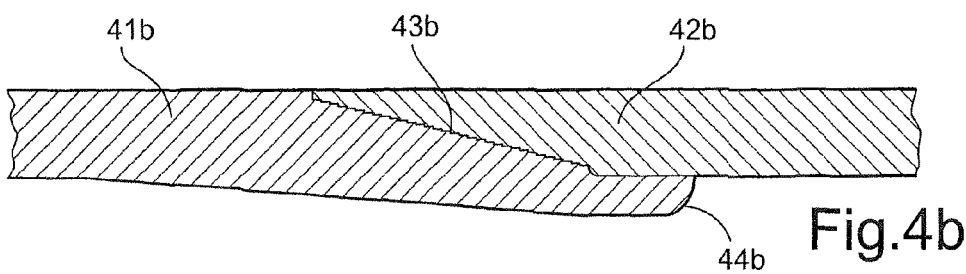

FIG. 4B shows a transparent first component part 41b and an opaque second component part 42b. The first and second component parts 41b, 42b are joined end-to-end by a seam 43b comprising a number of steps. The seam extends over a distance 2.5 times the thickness of the second component part 42b, in a direction transverse to the direction of the seam 43b between the component parts. The first component part 41b has a wall thickness that is arranged to increase in the direction of the second component part 42b. In order to avoid a visible increase of the transparent first component 41b, the wall thickness is increased gradually from 3 mm to 4 mm over a distance of 65 mm from the front edge of the first component 41b. The increased wall thickness is located on the inner, or rear, surface of the first component part 41b.

The second component part 42*b* has a constant wall thickness of 3 mm. The front surfaces of the respective joined component parts are completely flush with each other along the seam. In the region of the seam, a leading edge of the first component part 41*b* is provided with a lip 44*b* arranged to overlap the second component part 42*b* in order to reinforce and hide the seam 43*b*. The extent of the overlap in the transverse direction of the seam is up to the thickness of the dispenser part. The thickness of the lip 44*b* is gradually decreased to zero, for instance by a rounded section shown in FIG. 4B. The part of the wall having an increased thickness extends past the end of the stepped portion of the seam 43*b* and is then rounded off towards the inner surface of the second component part 42*b*.

Figure 4C:
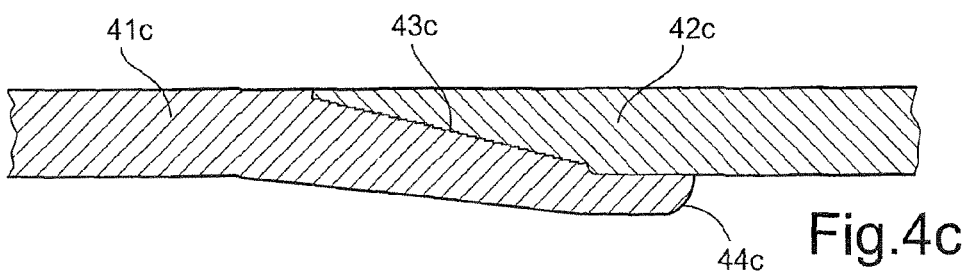

FIG. 4C shows a transparent first component part 41*c* and an opaque second component part 42*c*. The first and second component parts 41*c*, 42*c* are joined end-to-end by a seam 43*c* comprising a number of steps. The seam extends over a distance 2.5 times the thickness of the second component part 42*c*, in a direction transverse to the direction of the seam 43*c* between the component parts. The first component part 41*c* has a wall thickness that is arranged to increase in the direction of the second component part 42*c*. In order to reduce a visible increase of the transparent first component 41*c*, the wall thickness is increased gradually in the said transverse direction. The wall thickness is increased from 3 mm to 4 mm over a distance of 15 mm from the front edge of the first component 41*c*. The second component 42*c* has a constant wall thickness of 3 mm. The front surfaces of the respective joined component parts are completely flush with each other along the seam. In the region of the seam, a leading edge of the first component part 41*c* is provided with a lip 44*c* arranged to overlap the second component part 42*c* in order to reinforce and hide the seam 43*c*. The extent of the overlap in the transverse direction of the seam is up to the thickness of the dispenser part. The thickness of the lip 44*c* is gradually decreased to zero, for instance by a rounded section shown in FIG. 4C. The wall having an increased thickness extends past the end of the stepped portion of the seam 43*c* and is then rounded off towards the inner surface of the second component part 42*c*.

Figure 4D:
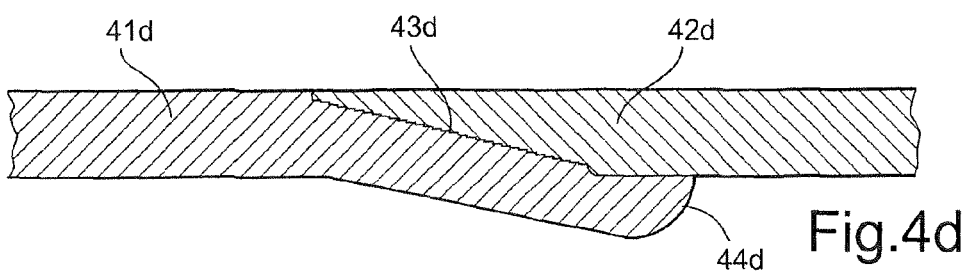

FIG. 4D shows a transparent first component part 41*d* and an opaque second component part 42*d*. The first and second component parts 41*d*, 42*d* are joined end-to-end by a seam 43*d* comprising a number of steps. The seam extends over a distance 2.5 times the thickness of the second component part 42*d*, in a direction transverse to the direction of the seam 43*d* between the component parts. The first component 41*d* has a wall thickness that is arranged to increase in the direction of the second component part 42*d*. In order to avoid a visible increase of the transparent first component 41*d*, the wall thickness is increased gradually and parallel to the angle of the seam in the said transverse direction. The wall thickness is increased from 3 mm to 4 mm from a position on the inner surface immediately opposite the leading edge of the second component part 42*d* where it contacts the first component 41*d*. The second component 42*d* has a constant wall thickness of 3 mm. The front surfaces of the respective joined component parts are completely flush with each other along the seam. In the region of the seam, a leading edge of the first component part 41*d* is provided with a lip 44*d* arranged to overlap the second component part 42*d* in order to reinforce and hide the seam 43*d*. The extent of the overlap in the transverse direction of the seam is up to the thickness of the dispenser part. The thickness of the lip 44*d* is gradually decreased to zero, for instance by a rounded section shown in FIG. 4D. The part of the wall having an increased thickness extends parallel with and past the end of the stepped portion of the seam 43*d* and is then rounded off towards the inner surface of the second component part 42*d*.

FIGS. 4B-4D show a seam with an overlap, where an edge portion or a lip 44*b*, 44*c*, 44*d* on one dispenser part extends past the transverse extension of the seam. The lip 44*b*, 44*c*, 44*d* partially overlaps the rear surface on the opposite dispenser part to reinforce the seam. Comparative bending and impact tests have shown that an overlap of this type will only give a limited improvement of the strength of the seam in bending. However, a noticeable positive effect was noted during impact testing. Hence, in order to further improve the impact strength of a dispenser part, an overlapping region as described above can be provided along a portion of the seam that is likely to be subjected to an impact. An example of such a portion can be the front surface of an outer cover of a washroom paper towel dispenser.

Figure 5:
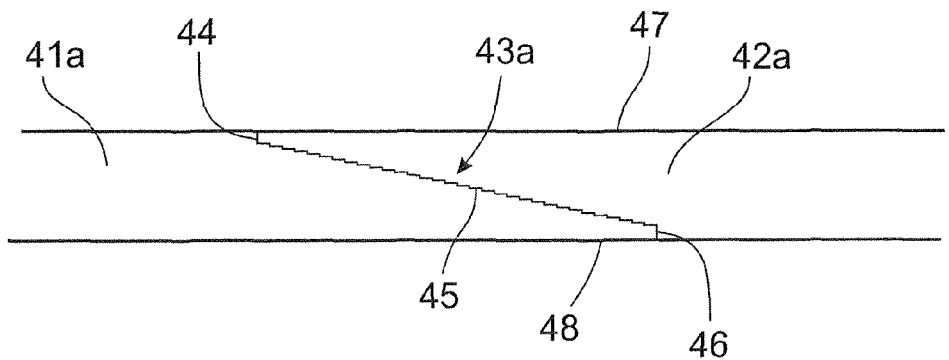
FIG. 5 shows an enlarged view of the seam of FIG. 4A.

FIG. 5 shows an enlarged view of the seam of FIG. 4A, comprising a transparent first component part 41*a* and an opaque second component part 42*a*. The front edge of the first component part 41*a* is injection moulded to form a number of distinct steps 44, 45, 46. The height of the steps is selected depending on the thickness of the dispenser wall adjacent the seam 43*a*. In this example, the dispenser wall thickness adjacent the seam is 3 mm, and the height of the steps is selected based on this measurement. For instance, in a seam 43*a* connecting a transparent part 41*a* and an opaque part 42*a*, a first step 44 adjacent the outer surface 47 of the dispenser part has been selected larger than a number of intermediate steps 45. This gives a distinct line separating the two parts 41*a*, 42*a* and facilitates filling of the mould adjacent the edge of the first part 41*a* during the second injection moulding step. A higher first step 46 adjacent the seam 43*a* will also prevent this portion of the dispenser part from becoming partially transparent. Similarly, a final step 46 adjacent the inner surface 48 of the dispenser part has been selected larger than the intermediate steps 45 to facilitate filling of the mould adjacent the edge of the first part 41*a*. In the latter case, the steps 44, 46 provided adjacent both the outer and the inner surfaces 47, 48 have each been given a height of 0.2 mm. For a dispenser wall having a constant total thickness of 2 mm these outer, first steps can be separated by a number of intermediate steps of 0.05-0.1 mm. In this case the intermediate steps have an equal height of 0.05 mm.

Figure 6:
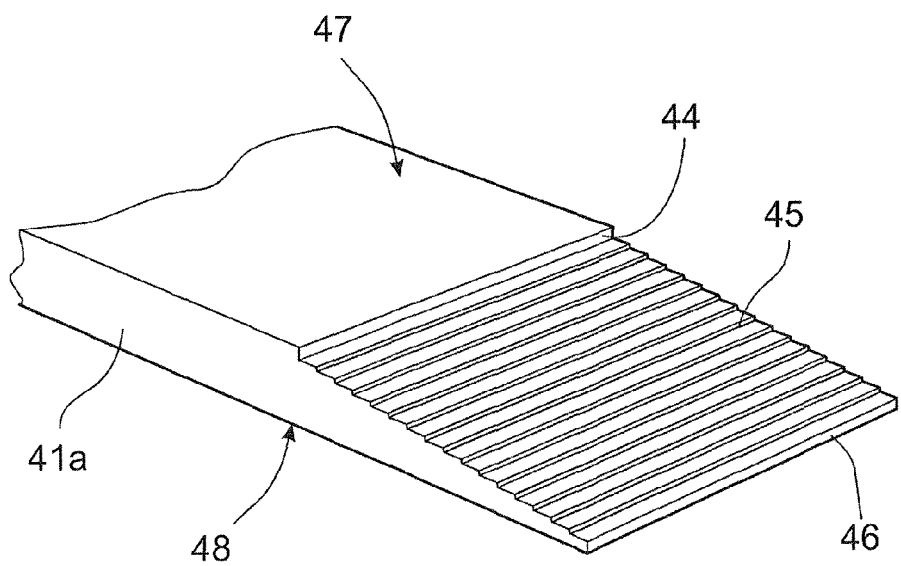
FIG. 6 shows a schematic enlarged section of a first dispenser part provided with multiple steps according to a first example.

FIG. 6 shows a schematic enlarged section of a component part provided with multiple steps as shown in according to a first example. This component part corresponds to the first component part 41*a* shown in FIG. 5. As described above, the front edge of the first component part 41*a* is injection moulded to form a number of distinct steps 44, 45, 46 during a first injection moulding step according to the invention. A first step 44 adjacent the outer surface 47 of the component part has a larger height than a number of intermediate steps 45. Similarly, a final step 46 adjacent the inner surface 48 of the component part has been selected larger than the intermediate steps 45 to facilitate filling of the mould adjacent the edge of the first component part 41*a*. The first component part 41*a* will be joined to the second component part 41*b* (see FIG. 5) during the second injection moulding step.

Figure 7:
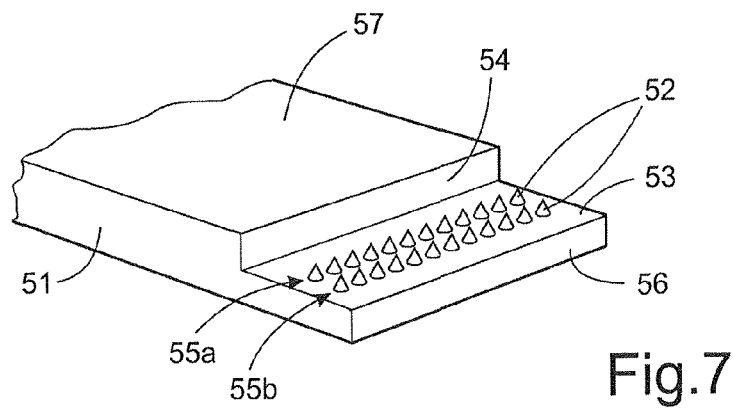
FIG. 7 shows a schematic enlarged section of a first dispenser part provided with projections according to a second example.

FIG. 7 shows a schematic enlarged section of a first component part 51 provided with projections 52 according to a second example. According to this example, a contact surface 53 is provided with raised contact increasing means in the form of a number of conical projections 52. Similar to the above example, the front edge of the first component part 51 is injection moulded to form at least two steps 54, 56. A first step 54 adjacent an outer surface 57 of the component part has a height corresponding to half the thickness of the first component part 51. In FIG. 7 the raised contact increasing means form two rows 55*a*, 55*b* of conical projections 52 along the length of the front edge. Alternatively, the multiple, individual projections can be arranged in at least one regular or irregular line along the length of the seam. The projections can also be evenly distributed over the entire second contact surface. The front edge with its associated projections 52, contact surface 53 and steps 54, 56 will subsequently form part of a seam between the first component part 51 and an injection moulded second component part (not shown) to form a dispenser part.

Figure 8:
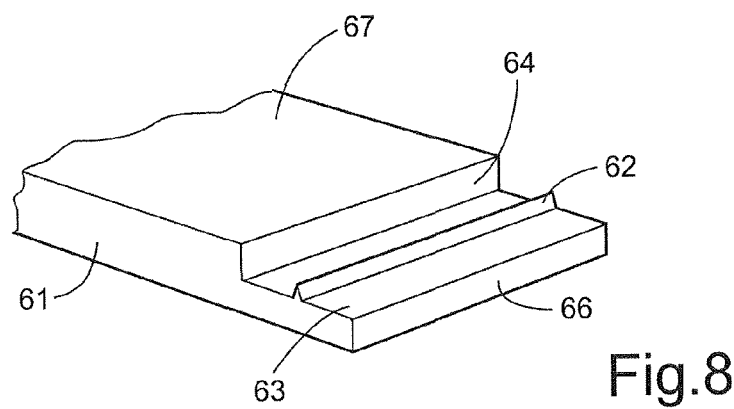
FIG. 8 shows a schematic enlarged section of a first dispenser part provided with a ridge according to a third example.

FIG. 8 shows a schematic enlarged section of a first component part 61 provided with a ridge 62 according to a third example. According to this example, a contact surface 63 is provided with raised contact increasing means in the form a ridge 62 extending parallel to a front edge of the first component part 61. Similar to the above example, the front edge of the first component part 61 is injection moulded to form at least two steps 64, 66. A first step 64 adjacent an outer surface 67 of the component part has a height corresponding to half the thickness of the first component part 61. In FIG. 8 the raised contact increasing means form a single V-shaped ridge 62 along the length of the front edge. Alternatively the ridge may have an I- or U-shaped or a rectangular cross-section in the transverse direction of the front edge. In addition, multiple, parallel ridges can be provided. The front edge with its associated projections 62, contact surface 63 and steps 64, 66 will subsequently form part of a seam between the first component part 61 and an injection moulded second component part (not shown) to form a dispenser part.

Figure 9:
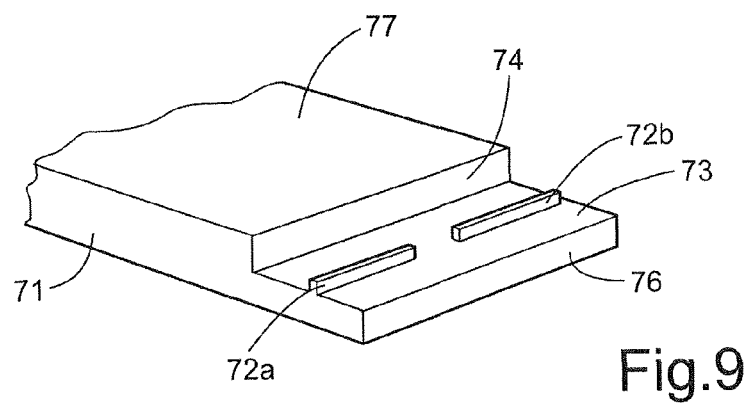
FIG. 9 shows a schematic enlarged section of a first dispenser part provided with intermittent ridges according to a fourth example.

FIG. 9 shows a schematic enlarged section of a first component part 71 provided with intermittent ridges 72*a*, 72*b* according to a fourth example. According to this example, a contact surface 73 is provided with raised contact increasing means in the form of a flat, rectangular, or I-shaped ridge 72*a*, 72*b* extending parallel to a front edge of the first component part 71. Similar to the above example, the front edge of the first component part 71 is injection moulded to form at least two steps 74, 76. A first step 74 adjacent an outer surface 77 of the component part has a height corresponding to half the thickness of the first component part 51. In FIG. 9 the raised contact increasing means form an intermittent I-shaped ridge 62, which ridge is provided for strengthening selected portions along the length of the front edge. Alternatively the ridge may have an V- or U-shaped cross-section in the transverse direction of the front edge. In addition, multiple, parallel ridges can be provided, which intermittent ridges can be staggered. The front edge with its associated projections 72*a*, 72*b*, contact surface 73 and steps 74, 76 will subsequently form part of a seam between the first component part 71 and an injection moulded second component part (not shown) to form a dispenser part.

In the above examples, as shown in FIGS. 6-9, the at least one projection or ridge may have a height up to half the thickness of the first step, measured from the base of the projection or ridge, in the plane of the first contact surface, to the outer surface of the dispenser part in a direction at right angles to the said outer surface. The projections/ridges can be given the same or different heights. Also, the resulting seam described in the above examples may extend over a distance of up to 5 times the thickness of the thinner of the first and second parts, in a direction transverse to the direction of the seam between the component parts. For instance, in FIG. 6 the width of the resulting seam corresponds to the distance between first and second steps 44, 46 measured at right angles from the front edge.

Figure 10:
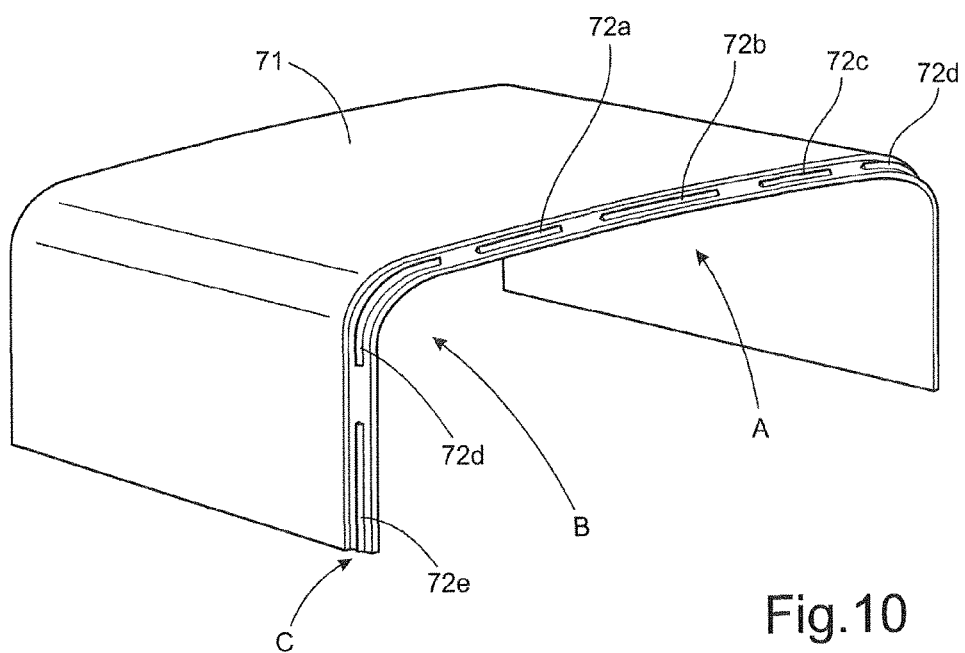
FIG. 10 shows a schematic illustration of a dispenser part provided with intermittent ridges as shown in FIG. 9.

FIG. 10 shows a schematic illustration of a component part 71 provided with intermittent ridges 72*a*, 72*b*, 72*c*, 72*d*, 72*e* as shown in FIG. 9. As schematically indicated in FIG. 10, the ridges are located in areas where the strain caused by external loading is expected to be relatively large. For instance, a number of ridges 72*a*, 72*b*, 72*c* are located closer together along a section A of a the middle of a front surface of the component part 71, which is likely to experience impact loading. The ridges 72*a*, 72*b*, 72*c* can be placed closer together and/or be made longer in this section. An impact load on the front surface will also increase the strain in a corner section B of the component part 71, requiring a reinforcing ridge 72*d* in each such section B.

The component part 71 also comprises a free side edge section C, which can be subjected to strain caused by both impact loading and forces induced in the material during cooling of the injection moulded dispenser part. Hence each side edge section C is provided with a reinforcing ridge 72*e*. Note that the ridges in FIG. 10 are not drawn to scale, for reasons of clarity.

Figure 11:
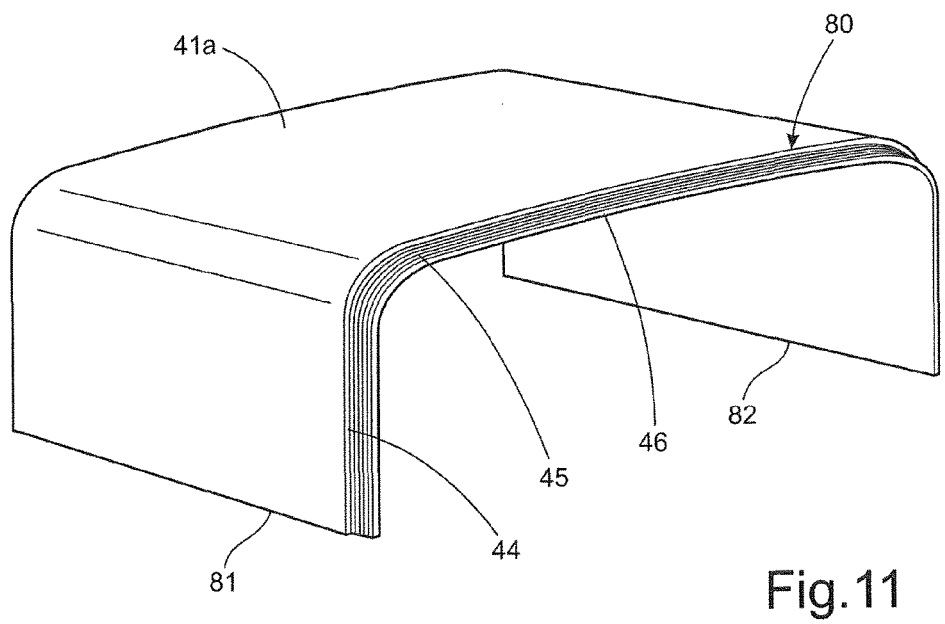
FIG. 11 shows a schematic illustration of a dispenser part provided with a stepped edge as shown in FIG. 6.

FIG. 11 shows a schematic illustration of the component part 41*a* provided with a stepped edge 80 comprising a number of distinct steps 44, 45, 46, as shown in FIG. 6. In FIG. 11 it can be seen how the stepped edge 80 extends continuously from one side edge 81 of the component part 41*a* to a second side edge 82.

Figure 12A:
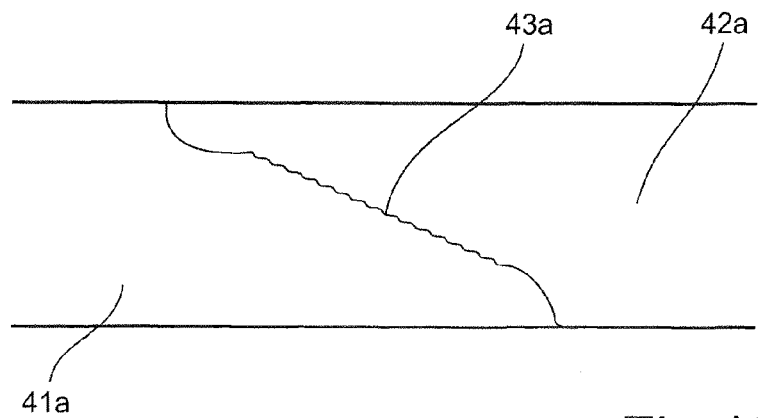
FIG. 12A-C show illustrations of cross-sections through a number of seams according to the invention.
Figure 12B:
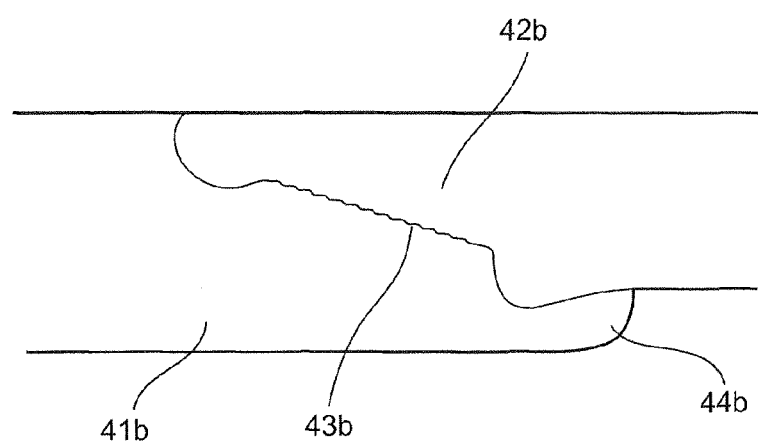
Figure 12C:
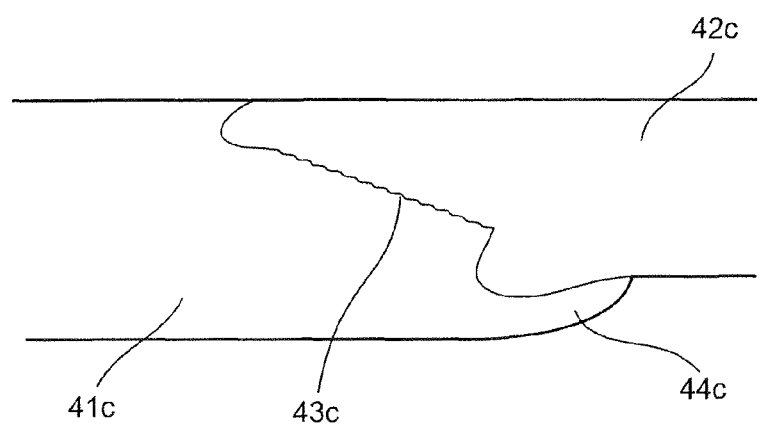

FIGS. 12A-12C show illustrations of actual photographs of cross-sectional samples through a number of dispenser parts corresponding to the schematic cross-sections shown in FIGS. 4A-4C. In FIGS. 12A-12C the dispenser parts have been cut in a transverse direction of the seam between the first and second component parts. Hence FIG. 12A, corresponding to FIG. 4A, shows a transparent first component part 41*a* and an opaque second component part 42*a*. The first and the second component parts 41*a*, 42*a* have the same wall thickness of 3 mm and are joined end-to-end by a seam 43*a* comprising a number of steps. As can be seen from the figure, the contact surfaces have been joined and the corners of the distinct steps have melted to form rounded surfaces and merged with the second component part 42*a* during the second injection moulding step.

FIGS. 12B and 12C show a transparent first component part 41*b*, 41*c* and an opaque second component part 42*b*, 42*c*. The first and second component parts 41*b*, 42*b*; 41*c*, 42*c* are joined end-to-end by a seam 43*b*, 43*c* comprising a number of steps. The seam extends over a distance 2.5 times the thickness of the second component part 42*b*, 42*c*, in a direction transverse to the direction of the seam 43*b*, 43*c* between the component parts. The first component part 41*b*, 41*c* has a wall thickness that is arranged to increase in the direction of the second component part 42*b*, 42*c*. A leading edge of the first component part 41*b*, 41*c* is provided with a lip 44*b*, 44*c* arranged to overlap the second component part 42*b*, 42*c* in order to reinforce and hide the seam 43*b*, 43*c*. As shown in FIG. 12A, the contact surfaces have been joined and the corners of the distinct steps have melted to form rounded surfaces and merged with the second component part 42*b*, 42*c* during the second injection moulding step.

As opposed to a prior art solution as shown in FIG. 3, the seam between two component parts is able to withstand an impact test subjecting the dispenser part to an impact of 15 joule. This test is described in further detail below. When subjected to impact loading in excess of that used in the said test, the dispenser part will crack adjacent and parallel to the seam.

Figure 13:
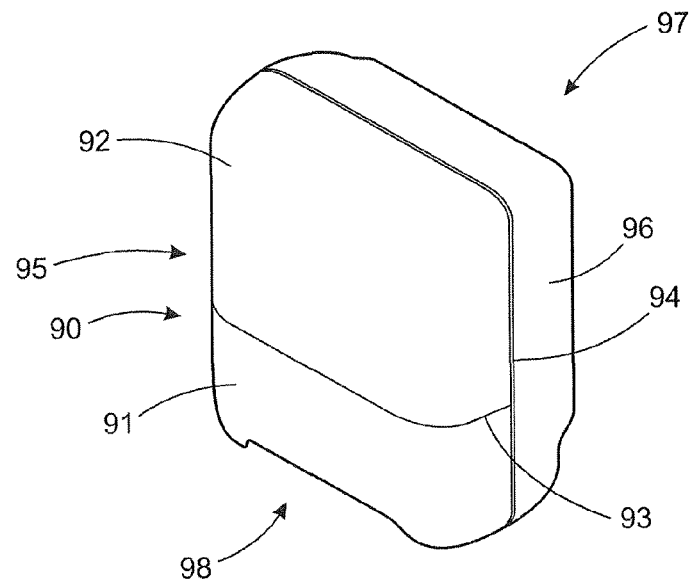
FIG. 13 shows a first example of a dispenser comprising a dispenser part according to the invention.

FIG. 13 shows a first example of a dispenser comprising a dispenser part according to the invention. In this example, a dispenser part 90 is formed by a transparent first component part 91 and an opaque second component part 92. The first component part 91 and the second component part 92 are joined by a seam 93 extending from a first side edge 94 to a second side edge 95 of the dispenser part 90. The component parts 91, 92 can be joined by any one of the seams described in connection with the FIGS. 6-9. The dispenser part 90 is detachably joined to a rear dispenser section 96, in order to form a dispenser housing 97. The rear dispenser section 96 is arranged to be mounted on a vertical surface, such as a wall. In this example, the dispenser housing 97 is intended for a dispenser for a stack of paper towels or similar, which are removed through a dispenser opening 98 in a lower surface of the dispenser.

Figure 14:
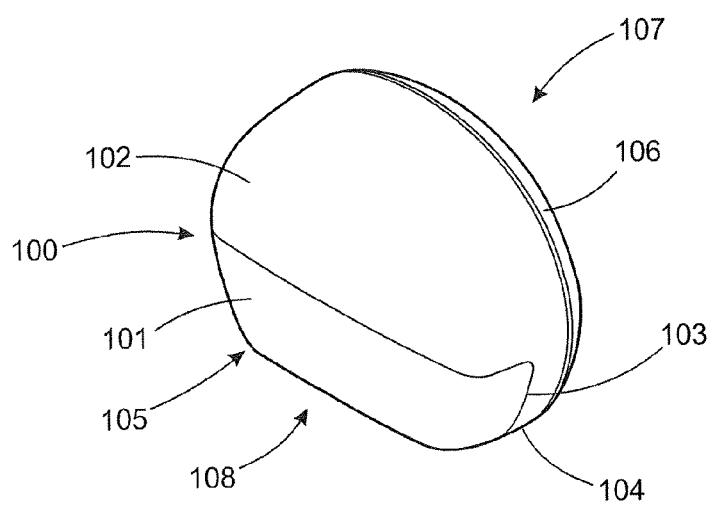
FIG. 14 shows a second example of a dispenser comprising a dispenser part according to the invention.

FIG. 14 shows a second example of a dispenser comprising a dispenser part according to the invention. In this example, a dispenser part 100 is formed by a transparent first component part 101 and an opaque second component part 102. The first component part 101 and the second component part 102 are joined by a seam 103 extending from a first side edge 104 to a second side edge 105 located along a lower delimiting section of the dispenser part 100. The component parts 101, 102 can be joined by any one of the seams described in connection with the FIGS. 6-9. The dispenser part 100 is detachably joined to a rear dispenser section 106, in order to form a dispenser housing 107. The rear dispenser section 106 is arranged to be mounted on a vertical surface, such as a wall. In this example, the dispenser housing 107 is intended for a dispenser for a roll of paper or similar, which is removed through a dispenser opening 108 in a lower surface of the dispenser.

Figure 15:
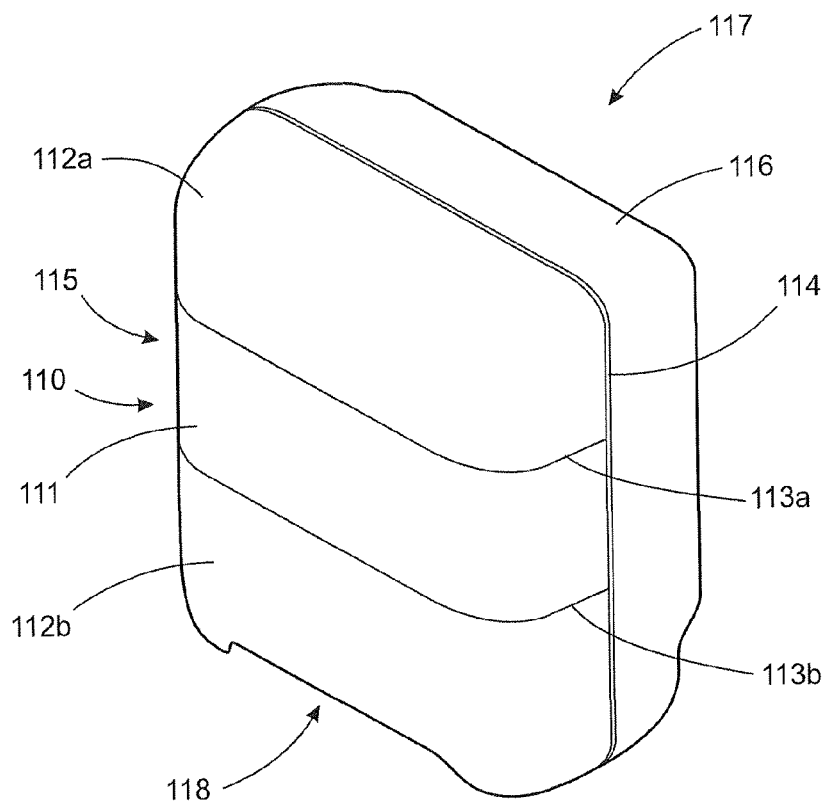
FIG. 15 shows a third example of a dispenser comprising a dispenser part according to the invention.

FIG. 15 shows a third example of a dispenser comprising a dispenser part according to the invention. In this example, a dispenser part 110 is formed by a central transparent first component part 111 and an upper and a lower opaque second component part 112a, 112b. The first component part 111 and the second component parts 112a, 112b are joined by seams 113a and 113b, respectively. Both seams 113a, 113b extend in parallel from a first side edge 114 to a second side edge 115 of the dispenser part 110. The component parts 111, 112a, 112b can be joined by any one of the seams described in connection with the FIGS. 6-9. The dispenser part 110 is detachably joined to a rear dispenser section 116, in order to form a dispenser housing 117. The rear dispenser section 116 is arranged to be mounted on a vertical surface, such as a wall. In this example, the dispenser housing 117 is intended for a dispenser for a stack of paper towels or similar, which are removed through a dispenser opening 118 in a lower surface of the dispenser.

Figure 16:
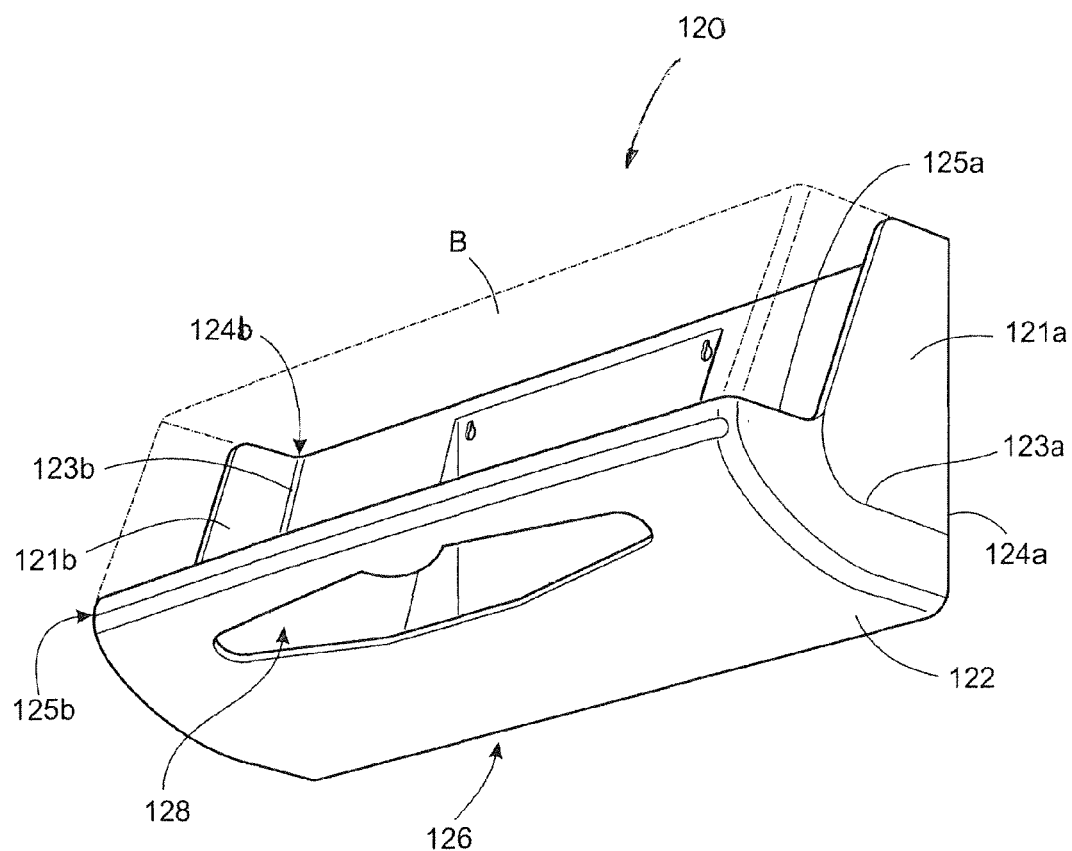
FIG. 16 shows a fourth example of a dispenser comprising a dispenser part according to the invention.

FIG. 16 shows a fourth example of a dispenser comprising a dispenser part according to the invention. The figure shows a perspective, lower view of a dispenser of the one-piece or single part type, in this case a dispenser of a bracket type. According to the invention, the dispenser part comprises a bracket 120 for containing or supporting a bag or box of wipes B (indicated in dash-dotted lines). The bracket 120 comprises a pair of transparent first component parts 121a, 121b on either side of the bracket 120 and a single rear and a lower opaque second component part 122. The first component parts 121a, 121b and the second component part 122 are joined by seams 123a and 123b, respectively. Both seams 123a, 123b extend from a first side edge 124a, 124b at the rear of the bracket to a second side edge 125a, 125b adjacent the front of the bracket 120. The component parts 121a, 121b, 122 can be joined by any one of the seams described in connection with the FIGS. 6-9. The bracket 120 is provided with a rear section 126 (not shown) allowing it to be attached to a wall or a similar vertical surface. In this example, the bracket 120 is intended for a dispenser for a box B containing stack of paper towels or similar, which are removed through a dispenser opening 128 in a lower surface of the dispenser.

A single part bracket dispenser can be made from at least two plastic component parts, having two or more different colours or a combination of transparent, frosted or opaque sections. A similar bracket type dispenser can be used for soap dispensers that comprise a one-piece bracket in or on which a soap re-fill bottle will be contained or supported. In the latter case, the re-fill bottle can be made to look like a "hood" or an outer cover as used in commonly available types of soap dispensers. In other words the refill (i.e. the soap bottle) will take the place of one of the parts of the dispenser (i.e. the hood). In such cases the bracket type dispenser forms a single part dispenser defined as a dispenser part according to the invention.

When selecting materials it must be determined that the resins used are generally compatible, with no antagonistic effects between resins. Suitable materials for use in the above method are acrylonitrile butadiene styrene (ABS) plastics and/or methyl methacrylate-ABS (MABS) plastics. However, these materials are given by way of example only and the invention is not limited to these materials. The materials tested in the examples below are Terlux® TR2802 MABS (BASF Corp.) or Polylux® C2 MABS (A. Schulman GmbH) for the transparent first part and Polyman® M/MI A40 ABS (A. Schulman GmbH) for the opaque second part.

A comparative bending test was performed using a selection of the above materials for the seams as described in connection with FIGS. 3 and 4A-D. The test used conforms to ISO 178:2001. Test samples in the form of five individual strips with the dimensions 1 cm by 10 cm were cut from a number of injection moulded components. The seam configurations included a prior art seam, shown in FIG. 3, as a reference sample, the seams shown in FIGS. 4A-D, and a sample comprising a length of a homogenous opaque material having the same thickness as the reference sample. As indicated in Table 1, all but one of the samples comprising a seam was made by joining the same two materials. The samples were held at each free end and subjected to a force applied to the seam. During this test the peak load (MPa) and the stress at break (MPa) was recorded.

In Table 1, the samples 1A-1C represent a seam according to the reference seam of FIG. 3, where the samples comprise different materials joined at different injection temperatures. Similarly, samples 2A-2B represent a seam according to the seam of FIG. 4A, while samples 3-5 represent the seams according to FIGS. 4B-D, respectively. Sample 6 comprises a length of a homogenous opaque material with the same thickness as the reference sample.

In order to improve the properties of the seam between two component parts it was also discovered that a purposeful selection of injection temperatures during the first and/or second injection moulding step had a positive effect.

According to one example, a dispenser part was made comprising Polylux® C2 MABS (A. Schulman GmbH) for the transparent first part and Polyman® M/MI A40 ABS (A. Schulman GmbH) for the opaque second part of the dispenser part. The injection, or barrel, temperature was modified for the first injection moulding step. According to a materials catalogue comprising technical data for the said plastic materials supplied by A. Schulman GmbH; "Schulamid"®; page 28; (3$^{rd}$ edition May 2006), it can be seen that the recommended injection temperature for Polylux® C2 MABS is 200-240° C.

When performing the two-component injection moulding process according to the invention, the first injection moulding step used an injection temperature of 260-290°, preferably 280° C., for the transparent first component part. Combined with the seam configuration as shown in FIGS. 4A-D, in particular FIG. 4A, subsequent testing showed that the increased injection temperature during the first injection step resulted in an improved structural strength of the seam joining the component parts.

TABLE 1

Bending test

| No. | Material | Temperature (° C.) Opaque/Transparent | Peak Load (MPa) | Stress at Break (MPa) |
|---|---|---|---|---|
| 1A | Polyman/Terlux | 240/240 | 34.8 | 39.8 |
| 1B | Polyman/Polylux C2 | 240/240 | 24.0 | 29.6 |
| 1C | Polyman/Polylux C2 | 240/280 | 28.3 | 33.9 |
| 2A | Polyman/Polylux C2 | 240/240 | 58.2 | 64.8 |
| 2B | Polyman/Polylux C2 | 240/280 | 64.4 | 71.8 |
| 3 | Polyman/Polylux C2 | 240/280 | 39.7 | 29.8 |
| 4 | Polyman/Polylux C2 | 240/280 | 44.4 | 33.8 |
| 5 | Polyman/Polylux C2 | 240/280 | 30.7 | 19.5 |
| 6 | Polyman | 240 | 60.9 | 4.8 |
| 7 | Polylux C2 | 280 | 53.6 | 4.7 |

As can be seen from Table 1, samples 2A and 2B representing the seam shown in FIG. 4A will provide an adhesion between the two component parts that is equal to or better than sample 6, comprising a length of a homogenous opaque material. The test also shows that the strength of the seam in samples 2A and 2B is almost twice that of the reference sample, irrespective of material or injection temperature.

During the tests it was discovered that samples 3-5, in spite of having a seam of substantially the same configuration, tended to break adjacent the rounded end section of the transparent component parts where it joined the opaque component part. It would appear that the end section created a weakened section at this point. In spite of this, the strength of the samples 3-5 is still equal to or higher than that of the reference samples 1A-1C.

An additional test performed was an impact test, simulating an external force applied to a dispenser part shaped as a front cover in the region of the seam. A suitable test developed for this purpose involves suspending a weight attached to a pivoted arm, which weight is released to strike a limited area of a front surface of a dispenser cover mounted on a fixed surface or to a support for attaching the dispenser to a wall. This test simulates a dispenser being struck with a predetermined force by an object or a person.

According to one example, the test used a 13 kg weight attached to an arm having a length of 0.75 m. The part of the weight arranged to impact a front surface of the dispenser part had an area corresponding to the average area of an adult male human fist, corresponding to a flat rectangular area of about 63 cm$^2$ (7×9 cm). The arm to which the weight is attached was pivoted from a vertical to a horizontal position, through an arc of approximately 34°, and released. This angle can be selected and set to give a repeatable desired impact energy. The impact energy absorbed by the dispenser part using the test settings described above is intended to correspond to a value of 15 Joule (J). During testing, dispenser parts were subjected to impacts of 10 and 15 J, respectively. The lower value was selected as a minimum acceptable level and the higher value was selected as a preferable level for impact strength without cracking.

A number of material combinations were tested and rejected due to at least one of the component parts being shattered by the impact. Further material combinations were tested and rejected due to cracking or splitting of the seam between the component parts.

After performing a significant number of tests to determine the strength of various seam configurations and material combinations it was determined that a combination of ABS materials or ABS and MABS materials resulted in a seam that had the desired properties. In addition to suitable surface finish properties, relating to e.g. gloss and scratch resistance, an injection moulded dispenser part comprising a seam according to the invention was found to have the desired strength and to withstand the impact test without cracking. Examples of such materials are Polylux® C2 MABS (A. Schulman GmbH) for the transparent first part and Polyman® M/MI A40 ABS (A. Schulman GmbH) for the opaque second part of the dispenser part.

The tool design used in the described example is a rotating plate. This comprises a two-station tool that rotates in a vertical (or horizontal) direction. The rotating plate is held in a first position at a first injection station for the injection of the first material. It is then rotated into a second position at a second injection station for the injection of the second material.

An alternative tool design is a core back. In a core back, a sliding core is first closed and the first material is injected. The sliding core is then opened and the second material is injected.

The invention is not limited to the above examples, but may be varied freely within the scope of the appended claims. For instance, in the above examples a combination of transparent and opaque materials are described. In addition, combinations of one or more coloured and/or transparent materials may be used. Also, the examples describe a single seam extending horizontally or at an angle across the front surface of the dispenser part. Alternative solutions may comprise one or more seams arranged vertically or to enclose a single corner. The seam need not only be located along a straight line, as described above, but can also be given a curved, wavy or an irregularly shaped line.

The invention claimed is:

1. A dispenser, comprising:
   a first injection moulded component part having a first edge and comprising, in a transverse direction to the first edge, a first inner step adjacent an inner surface of the dispenser, a first outer step adjacent an outer surface of the dispenser, and a first intermediate step between the first inner step and the first outer step, the first outer step having a height in the transverse direction that is larger than a height of the first intermediate step in the transverse direction; and
   a second injection moulded component part having a second edge, the second edge of the second component part moulded to join to the first edge of the first component part to form a seam, the second component part is flush with each of the steps of the first component part,
   wherein the first component part includes at least two external non-planar sides,
   wherein the first and second component parts are joined by the seam comprising at least one step, wherein the seam extends at least partly across the at least two external non-planar sides, and wherein the dispenser is manufactured by using a two component injection moulding process using a single mould.

2. A component part of a dispenser part manufactured by using a two component injection moulding process using a single mould, the two component injection moulding process creating at least two component parts joined by a seam, the component part comprising:

a first edge and including, in a transverse direction to the first edge, a raised contact surface formed along the first edge of the component part, the raised contact surface arranged to extend at right angles to an outer surface of the dispenser part adjacent the first edge, wherein the raised contact surface includes a first inner step adjacent an inner surface of the dispenser part, a first outer step adjacent an outer surface of the dispenser part, and a first intermediate step between the first inner step and the first outer step, the first outer step having a height in the transverse direction that is larger than a height of the first intermediate step in the transverse direction, wherein the component part is joined by the seam to a second component part that is flush with each of the steps of the first component part, wherein the component part is manufactured by using a component injection moulding process, wherein the component part includes at least two external non-planar sides, and wherein the first edge extends at least partly across the at least two external non-planar sides.

* * * * *